United States Patent
Senoo

(10) Patent No.: US 8,810,100 B2
(45) Date of Patent: Aug. 19, 2014

(54) ROTOR HAVING DIVIDABLE CORE FOR ELECTRIC MOTOR AND PRODUCTION METHOD THEREOF

(71) Applicant: Fanuc Corporation, Yamanashi (JP)

(72) Inventor: Tatsuya Senoo, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 66 days.

(21) Appl. No.: 13/687,405

(22) Filed: Nov. 28, 2012

(65) Prior Publication Data

US 2013/0187505 A1  Jul. 25, 2013

(30) Foreign Application Priority Data

Jan. 20, 2012 (JP) ................................. 2012-010248

(51) Int. Cl.
*H02K 1/28* (2006.01)

(52) U.S. Cl.
CPC ........................................ *H02K 1/28* (2013.01)
USPC .......... 310/156.59; 310/156.53; 310/216.009; 310/216.061

(58) Field of Classification Search
CPC .................................. H02K 1/28; H02K 1/30
USPC ............ 310/156.08, 156.48, 156.49, 156.51, 310/156.52, 156.53, 156.56, 156.59, 310/156.12, 156.13, 216.007, 216.008, 310/216.009, 216.038, 216.061, 216.015, 310/216.048, 216.062, 216.088, 261.1
See application file for complete search history.

(56) References Cited

U.S. PATENT DOCUMENTS

| | | | | |
|---|---|---|---|---|
| 4,697,114 A | * | 9/1987 | Amemiya et al. | 310/156.61 |
| 5,010,266 A | * | 4/1991 | Uchida | 310/156.22 |
| 5,786,650 A | * | 7/1998 | Uchida et al. | 310/156.55 |
| 5,889,346 A | * | 3/1999 | Uchida et al. | 310/156.57 |
| 5,939,810 A | * | 8/1999 | Uchida et al. | 310/156.57 |
| 6,369,687 B1 | | 4/2002 | Akita et al. | |
| 6,538,548 B2 | * | 3/2003 | Akita et al. | 336/234 |

(Continued)

FOREIGN PATENT DOCUMENTS

| | | |
|---|---|---|
| JP | 2000-116074 A | 4/2000 |
| JP | 2002-262496 A | 9/2002 |
| JP | 2007244064 A | 9/2007 |
| JP | 2010011738 A | 1/2010 |

OTHER PUBLICATIONS

Japanese Office Action for corresponding Patent Application No. 2012-010248 drafted Mar. 5, 2013.

(Continued)

*Primary Examiner* — John K Kim
*Assistant Examiner* — Robert E Mates
(74) *Attorney, Agent, or Firm* — Lowe Hauptman & Ham, LLP

(57) ABSTRACT

A rotor having a dividable core for an electric motor, and a production method thereof. A rotor has a generally annular supporting member; a plurality of shaft portions positioned on the supporting member in a circumferential direction at regular intervals, the shaft portions extending generally parallel to a rotation axis of the rotor; and a plurality of divided cores each having a hole portion which is fitted to each shaft portion. By annularly connecting the divided cores, a generally annular dividable core for the rotor is formed. Each divided core has connecting portions at both circumferential ends thereof, and each connecting portion is configured to be connected to a connecting portion of a neighboring divided core while the divided core is fitted to the shaft portion.

8 Claims, 3 Drawing Sheets

(56) References Cited

U.S. PATENT DOCUMENTS

| | | | |
|---|---|---|---|
| 7,378,774 B2 * | 5/2008 | Torii et al. | 310/216.041 |
| 8,456,055 B2 * | 6/2013 | Kinoshita | 310/216.009 |
| 2006/0071574 A1 * | 4/2006 | Stewart | 310/218 |
| 2009/0200499 A1 * | 8/2009 | Muramatsu et al. | 251/129.01 |
| 2010/0231084 A1 * | 9/2010 | Kinoshita | 310/216.009 |

OTHER PUBLICATIONS

Office Action mailed Nov. 6, 2013, corresponds to German patent application No. 102013000404.7.

* cited by examiner

ROTOR HAVING DIVIDABLE CORE FOR ELECTRIC MOTOR AND PRODUCTION METHOD THEREOF

REALATED APPLICATIONS

The present application claims priority from Japanese Application No. 2012-010248, filled Jan. 20, 2012, the disclosure of which is hereby incorporated by reference herein in its entirety.

BACKGROUND OF THE INVENTION

1. Field of the Invention

The present invention relates to a rotor having a dividable core for an electric motor, and a production method thereof.

2. Description of the Related Art

Generally, a rotor of an electric motor has a core which is constituted by stacking magnetic steel sheets, punched into an annular shape, in a direction of a rotation axis thereof. However, in some production methods of an (in particular, large) electric motor, in order to effectively use the magnetic steel sheets, a stator and/or the core of the rotor are not punched into an annular shape, instead, are punched into a plurality of members which are divided in a circumferential direction of the annular shape, and then the plurality of members are connected so as to form the annular shape.

For example, Japanese Unexamined Patent Publication (Kokai) No. 2000-116074 discloses a stacking mold device and a stacking method for a core member. Concretely, paragraph [0004] and FIG. 17 of this document describes that a first core member 4 is formed by aligning a plurality of core pieces 3 in a band shape, and core pieces 3 similar to the core pieces of first core member 4 are aligned in a band shape on first core member 4 so as to form a second core member 5 so that the first and second core members are symmetric in the longitudinal direction. These procedures are repeated so that edge portions 3a of core pieces 3 of first and second core members 4 and 5 are overlapped with each other, and edge portions 3a are rotatably coupled to each other by means of a pin member 6.

On the other hand, Japanese Unexamined Patent Publication (Kokai) No. 2002-262496 discloses a core structure of a rotary electric machine. Concretely, paragraph [0014] of this document describes that "a divided core 1 is formed by dividing a rotor core of a rotary electric machine into four sector shapes. On circumferential edge surfaces of divided sector core 1, key-shaped convex and concave features 2a and 2b are formed. In divided core 1, a slit 3 for inserting a magnet, and a dowel 4 for alignment used when stacking the cores, are formed. Key-shaped convex and concave features 2a and 2b may be fitted to each other as shown in FIG. 2, and a circular plate may be formed by combining four divided cores 1."

When a core is dividable as described in Japanese Unexamined Patent Publication (Kokai) No. 2000-116074 or Japanese Unexamined Patent Publication (Kokai) No. 2002-262496, magnetic steel sheet may be effectively used, on the other hand, production man-hours are increased due to a large number of components. When fitting (connecting) each component constituting the dividable core, a gap between each component may be uneven, a distance between poles may also be uneven, and therefore the electric motor may not be smoothly driven. When the fitting gap is eliminated, workability of the core is usually deteriorated, whereby the production man-hours are further increased. Therefore, in a rotor or stator using a dividable core, it is desired that (i) the core be easily produced (production man-hours are few) and that (ii) a gap between each component is even.

Further, when a dividable core is used for a rapidly rotating rotor, the rotor is often mechanically reinforced so that the rotor may have resistance to a centrifugal force when rotating, as well as a reaction torque. Therefore, while the number of components is increased by using a reinforcing member, the above points (i) and (ii) are still desirable.

SUMMARY OF THE INVENTION

In view of the above problems, the object of the present invention is to provide a rotor having a dividable core for an electric motor, and a production method thereof.

One aspect of the present invention provides a rotor of an electric motor, comprising: a generally annular supporting member; a plurality of shaft portions positioned on the supporting member in a circumferential direction at regular intervals, the shaft portions extending generally parallel to a rotation axis of the rotor; and a plurality of divided cores each having a hole portion which is fitted to each of the shaft portions and a connecting portion configured to be connected to a connecting portion of a neighboring divided core, wherein each of the divided cores is connected to the neighboring divided core by means of the connecting portion while being fitted to the shaft portion so that a generally annular core is formed.

In a preferred embodiment, the connecting portion of the divided core is configured to be connected to the connecting portion of the neighboring divided core by rotating the divided core about the shaft portion.

In a preferred embodiment, the rotor further comprises a cylindrical member which is fitted to an inner portion of the generally annular core.

In this case, it is preferable that an outer diameter of the cylindrical member be larger than an inner diameter of the generally annular core, and the cylindrical member be fitted to the inner portion of the generally annular member by interference fit.

In a preferred embodiment, the rotor further comprises a permanent magnet disposed between neighboring divided cores so that a magnetizing direction of the permanent magnet is perpendicular to a radial direction of the rotor.

In a preferred embodiment, the hole portion has a polygonal shape, and the shaft portion has a polygonal column shape.

In a preferred embodiment, the hole portion has a circular shape, and the shaft portion has a solid or hollow cylindrical shape.

Another aspect of the present invention provides a production method of a rotor of an electric motor, the method comprising the steps of: positioning a plurality of shaft portions on a generally annular supporting member in a circumferential direction at regular intervals, the shaft portions extending generally parallel to a rotation axis of the rotor; fitting a plurality of divided cores to respective shaft portions, each divided core having a hole portion which is fitted to each of the shaft portions and a connecting portion configured to be connected to a connecting portion of a neighboring divided core; and forming a generally annular core by rotating at least one of neighboring divided cores about the shaft portion so that the connecting portions of the neighboring divided cores are connected to each other.

In a preferred embodiment of the method, the method further comprises the step of fitting a cylindrical member to an inner portion of the generally annular core by interference fit, after the step of forming the generally annular core by connecting the divided cores to each other.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

Figure 1:
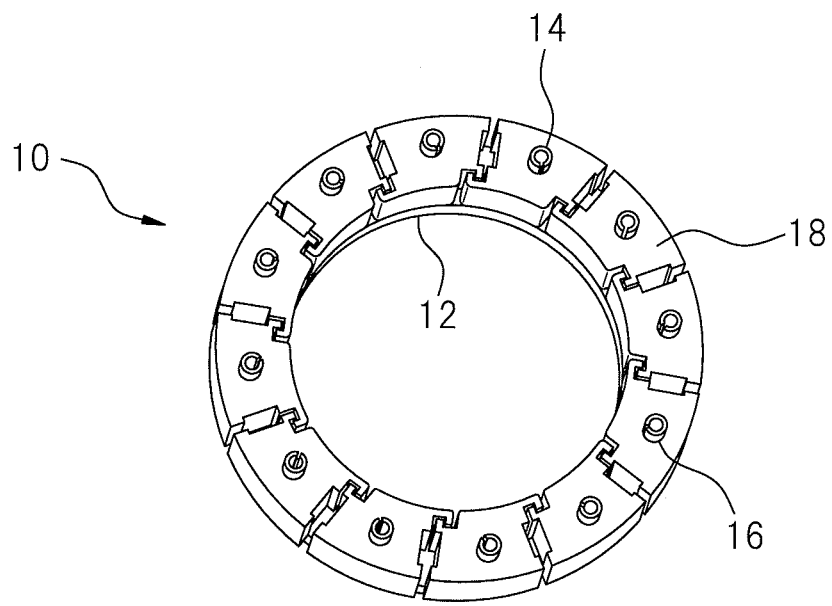
FIG. 1 is a view of a schematic configuration of a rotor of an electric motor according to one embodiment of the present invention.

FIG. 1 is a view of a schematic configuration of a rotor 10 of an electric motor according to one embodiment of the present invention. Rotor 10 has a generally annular supporting member 12; a plurality of shaft portions 14 positioned on supporting member 12 in a circumferential direction at regular intervals, the shaft portions extending generally parallel to a rotation axis of the rotor; and a plurality of (the same number as shaft portions 14) divided cores 18 each having a hole portion 16 which is fitted to each of shaft portions 14. In the illustrated embodiment, twelve shaft portions 12 are positioned at intervals of 30 degrees, and each shaft portion is a cylindrical spring pin. By annularly connecting divided cores 18, a generally annular dividable core for rotor 10 is formed.

Figure 2:
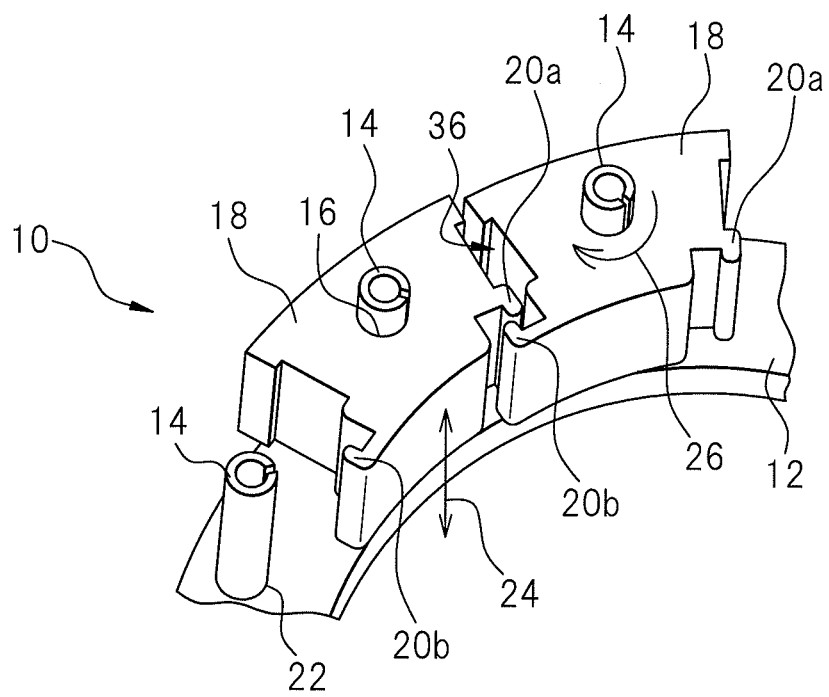
FIG. 2 is an enlarged view around a divided core of the rotor of FIG. 1.

In particular, as shown in FIG. 2, each divided core 18 has connecting portions 20*a* and 20*b* at both circumferential ends thereof, and each connecting portion are configured to be connected to a connecting portion of a neighboring divided core while the divided core is fitted to (for example, by press-fit) shaft portion 14. In detail, first connection portion 20*a* formed at a right side of one divided core 18 is connected to second connection portion 20*b* formed at a left side of a right-hand neighboring divided core, and second connection portion 20*b* formed at a left side of the one divided core 18 is connected to first connection portion 20*a* formed at a right side of a left-hand neighboring divided core. For example, spring pin 14 may be positioned on supporting member 12 by inserting a hole 22 formed on supporting member 12 in the circumferential direction at regular intervals.

For example, divided core 18 may be formed by press-cutting a magnetic steel plate by means of a press machine, etc. Each divided core may be formed as a single piece, otherwise, may be a block which is formed by stacking a plurality of (for example, ten to twenty) plate members in a direction (in FIG. 2, the vertical direction as shown by an arrow 24) generally parallel to the rotation axis of rotor 10. In the latter case, the divided core may be formed by sequentially stacking the plurality of plate members on supporting member 12 while being fitting to one shaft portion 14. Otherwise, a block-shaped divided core such as core 18 of FIG. 2 may be previously formed by caulking, etc., and then the block-shaped core may be fitted to shaft portion 14 and located on supporting member 12.

In the embodiment of FIG. 2, although both connecting portions 20*a* and 20*b* of each divided core 18 have a hook-like shape, the present invention is not limited thereto. Further, although each divided core 18 is identical to each other, the present invention is not limited thereto. For example, two types of divided cores may be provided, i.e., one type has identical concave connecting portions on the left and right sides thereof, and the other type has identical convex connecting portions on the left and right sides thereof, wherein the two types are alternately aligned so that the concave portion and the convex portion are engaged with each other.

As shown in FIG. 2, when connecting portions 20*a* and 20*b* are formed as hooks having front ends which extend in a generally radial direction of the rotor and extend opposing directions (see 28*a* and 28*b* in FIG. 3), neighboring divided cores may be connected to each other, by rotating at least one of the neighboring cores about shaft portion 14 (in the illustrated embodiment, rotating divided core 18 on the right side in a direction indicated by an arrow 26) while shaft portion 14 is inserted into the core. As such, in the configuration wherein the connecting portions may be connected by rotating the same, the press-fitting operation of divided core 18 into shaft portion 14 and the connecting operation of connecting portions 20*a* and 20*b* may be separately carried out, whereby the operations may be easily carried out. Further, since divided cores 18 are fitted to respective shaft portions 14 arranged on supporting member 12, each divided core 18 may be accurately positioned. Therefore, the connecting portions of the neighboring cores may be connected with no gap therebetween, whereby an annular core with high dimensional accuracy may be obtained.

In the core as shown in FIG. 17 of Japanese Unexamined Patent Publication (Kokai) No. 2000-116074, it could be understood that a plurality of core pieces are rotated by using pin members as joints, so that the core pieces cooperatively constitute a circular rotor. However, in such a structure, a gap at the joint may be a problem, in particular when the structure is used for a stator of an inner-rotor type electric motor, and thus a casing may be fastened by interference fit from the outside of a circular core so as to eliminate the gap. However, since the gap is increased when a member such as cylindrical member 32 is fastened by interference fit from the inside, it is difficult to equalize the gap at each joint. Further, in the structure as shown in FIG. 17 of Japanese Unexamined Patent Publication (Kokai) No. 2000-116074, the inserting operation of the pin member into the core piece and the fitting operation of the convex-concave portions of the neighboring core pieces must be simultaneously carried out, whereby the operations are difficult to carry out.

On the other hand, in the divided cores as shown in FIG. 8 of Japanese Unexamined Patent Publication (Kokai) No. 2002-262496, it could be understood that the divided cores are alternately stacked for accommodating the affect of the centrifugal force applied to rivets 9 which fasten the divided cores, and the divided cores neighboring in the circumferential direction are connected to each other by means of convex-concave shapes 2*a* and 2*b*. However, is such convex-concave shapes, the divided cores cannot be connected by rotating the same as shown in FIG. 2, the workability thereof is not good. Further, in the assembly sequence of the core in Japanese Unexamined Patent Publication (Kokai) No. 2002-262496, it could be understood that fastening by using the rivet is finally carried out. Therefore, the present invention is different from Japanese Unexamined Patent Publication (Kokai) No. 2002-262496 in that the divided core is press-fitted to the shaft portion (or a reinforcing member) such as the spring pin before the divided cores are connected to each other. In addition, in Japanese Unexamined Patent Publication (Kokai) No. 2002-262496, when the length of the core in the stacking direction becomes larger (i.e., the number of stacked cores is increased), misalignment between holes for rivets of the stacks is likely to occur, whereby the workability of driving the rivet may be deteriorated. The same is also applicable to when the rivet is replaced with the spring pin. On the other hand, in the present invention, the neighboring divided cores may be connected to each other after the divided core (or the stack thereof) is press-fitted to the shaft portion, whereby the workability is extremely high.

Figure 3:
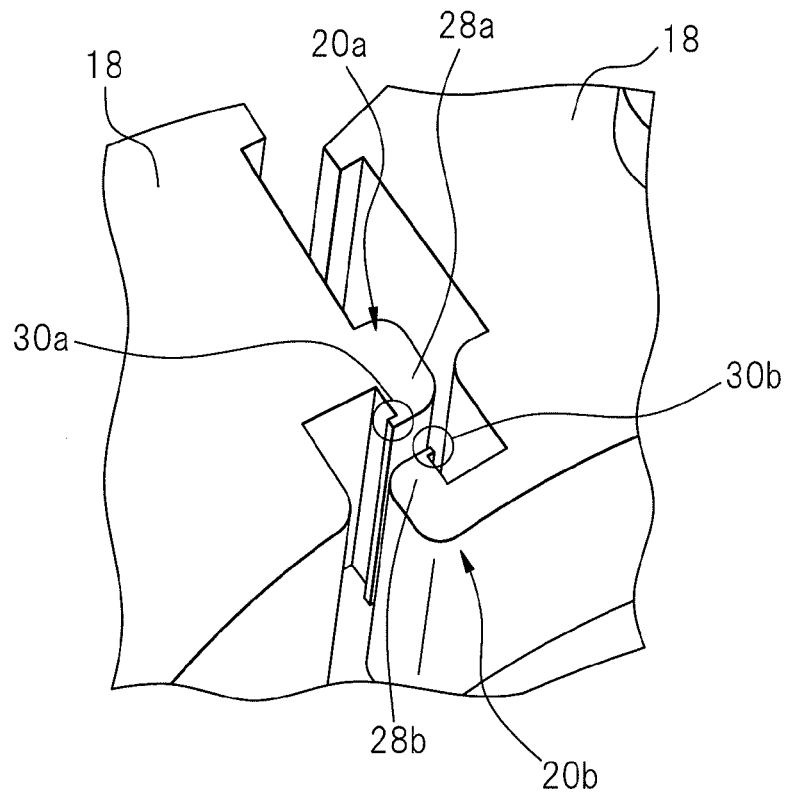
FIG. 3 is a view showing an example wherein a protruberance is arranged on a connecting portion of the divided core.

The connecting portions, capable being connected to each other by being rotated about the shaft portion, may be elastically deformable. For example, as shown in FIG. 3, front ends 28a and 28b of hook-shaped connecting portions 20a and 20b may have protruberances 30a and 30b, respectively, wherein the protruberances extend in the circumferential direction and opposing directions. When the rigidity of the connecting portion and the protruberance is high, the divided cores cannot be properly connected by rotating the divided core. However, when the rigidity of at least one of the connecting portion and the protruberance is low so as to be elastically deformed (for example, the front end is thin or the protuberance is small), the neighboring divided cores may be connected while elastically deforming the elastically deformable portion. By utilizing the elastic deformation, the connecting portion and the protruberance return to their original shapes when the connecting operation is completed, and the protruberance prevents the neighboring cores from moving relative to each other, whereby the divided cores may be securely connected.

Figure 4:
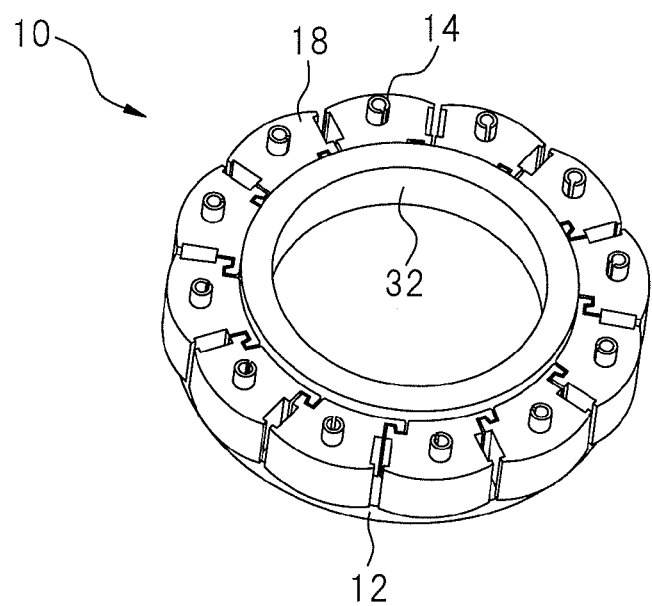
FIG. 4 is a view showing an example wherein a cylindrical member is fitted to an inner portion of the rotor of FIG. 1.

FIG. 4 shows an example wherein a cylindrical member 32 is attached to rotor 10 of FIG. 1. As shown, rotor 10 has cylindrical member 32 which is coaxially fitted to the inner portion of the annular core formed by divided cores 18. For example, cylindrical member 32 may be fixed to supporting member 12 which a hole for fixing is formed, by means of a bolt (not shown). Otherwise, cylindrical member 32 may be fixed to the inner portion of the annular core by interference fit such as shrinkage-fitting or press-fitting. When cylindrical member 32 is fixed by interference fit, the distance between each pole of rotor 10 may be equalized, whereby the rotation of the electric motor may be smooth.

In detail, when each divided core 18 is designed so that the connecting portions of the divided cores may be connected to each other with no gap therebetween but the connecting operation thereof cannot be manually completed, ideal connection may be carried out by interference fit of cylindrical member 32 which utilizes the surface pressure which acts on each divided core 18 in the outward radial direction. Otherwise, a gap may be formed between the connecting portions in order to improve the workability, the neighboring divided cores may be connected to each other while maintaining the gap, and then the distance between the neighboring divided cores may be increased by interference fit of cylindrical member 32. By virtue of this, the connecting portions are assuredly connected with no gap therebetween, and the distance between each pole may be constant. Therefore, when cylindrical member 32 is used, the connecting operation of the divided cores may not be manually completed.

Rotor 10 according to the present invention may be manufactured by a method comprising: positioning a plurality of shaft portions 14 on generally annular supporting member 12 in a circumferential direction at regular intervals; inserting shaft portions 14 of supporting member 12 into respective hole portions 16 of divided cores 18 configured to be fitted to the shaft portions so that divided cores 18 are located on supporting member 12; and forming the generally annular core by rotating at least one of neighboring divided cores 18 about shaft portion 14 so that connecting portions 20a and 20b of the neighboring cores are connected to each other. Further, when the rotor has cylindrical member 32, the rotor may be manufactured by fitting cylindrical member 32 to the inner portion of the generally annular core, after forming the generally annular core constituted by divided cores 18.

Preferably, at normal temperature, an outer diameter of cylindrical member 32 is larger than an inner diameter of the generally annular core, and thus cylindrical member 32 is fitted to the inner portion of the core by interference fit, concretely, by shrinkage-fitting, cooling-fit or press-fitting, etc. Further, by forming a screw hole (not shown) on cylindrical member 32, rotor 10 may be easily connected to another member.

Figure 5:
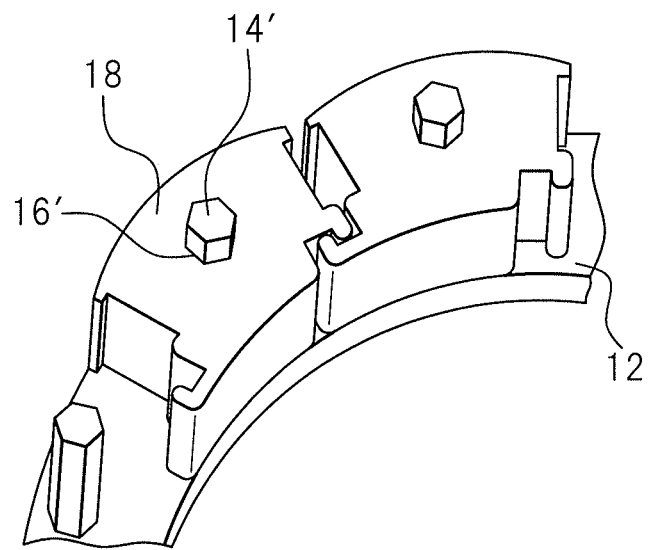
FIG. 5 is a view showing an example wherein a hole portion of the divided core and a shaft portion inserted into the hole portion have a polygonal shape.

In the embodiment of FIG. 2, hole portion 16 of divided core has the circular-shape, and shaft portion 14 configured to be fitted to the hole portion has the solid or hollow cylindrical shape. In this regard, the cylindrical shape may include a member having a generally C-shape such as spring pin 14. Otherwise, as a shape similar to the solid or hollow cylindrical shape, a member having a radial cross-section of an ellipse shape may be used. When the radial cross-section of shaft portion 14 is generally circular, a proper angular position of divided core 18 cannot be determined unless the divided core comes into contact with the connecting portion of the neighboring divided core after being rotated. Then, as shown in FIG. 5, when hole portion 16' of divided core 18 has a polygonal shape and shaft portion 14' configured to be fitted to the hole portion has a polygonal column shape, the angular position of the divided core may easily determined by using a plane of the polygonal shape. If both the hole portion and the shaft portion have polygonal shapes, it is difficult to rotate the divided core when there is no gap between the hole portion and the shaft portion or when both the hole portion and the shaft portion are formed by a material having high rigidity. However, divided core 18 may be easily rotated about shaft portion 14', by forming a certain gap (or allowance) between shaft portion 14' and hole portion 16' or by forming the shaft portion by a material which is more flexible than a material of the core.

Figure 6:
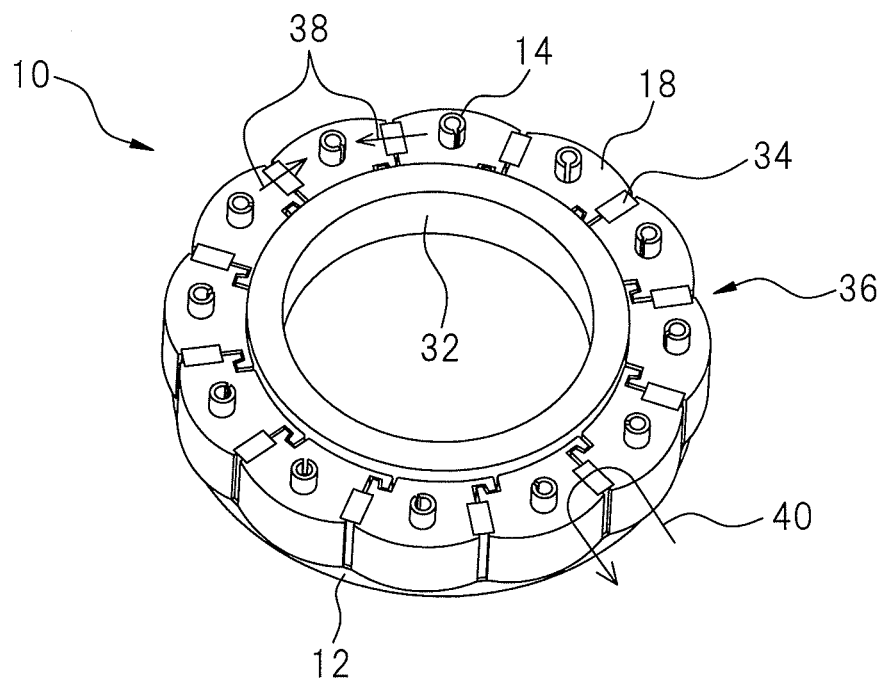
FIG. 6 is a view showing an example wherein permanent magnets are arranged to the rotor of FIG. 4.

FIG. 6 shows an example wherein a permanent magnet 34 is arranged in rotor 10. Permanent magnet 34 is disposed between neighboring divided cores 18. In particular, permanent magnet 18 is positioned in a recess portion 36 which is formed by denting a part of a circumferential edge of divided core 18. Rotor 10 as shown in FIG. 6 is a radial-type rotor wherein each permanent magnet 34 is positioned so that the magnetizing direction thereof (indicated by an arrow 38) is generally perpendicular to the radial direction of rotor 10. In general, in the electric motor wherein the connecting portion of the divided core functions as a part of a major magnetic path, the performance of the motor may be deteriorated since the magnetic flux is difficult to pass through the connecting portion. However, in the radial-type electric motor as shown in FIG. 6, an effective magnetic path may be formed by permanent magnet 34, as indicated by an arrow 40. In other words, in the embodiment of FIG. 6, the connecting portion, illustrated as the hook-shape, is not used as the major magnetic path, and thus it is not disadvantage if the magnetic flux is difficult to pass through the connecting portion.

According to the present invention, since the divided core is fitted to the shaft portion arranged on the supporting member, the positioning accuracy between the divided cores may be improved and there may be no gap between the connecting portions of the divided cores. As a result, an annular core with high dimensional accuracy may be obtained. Further, since the fitting operation of the divided core with the shaft portion and the connecting operation of the neighboring divided cores may be separated, the workability may be improved.

When the connecting portion is configured so that the neighboring divided cores may be connected to each other by rotating the divided core about the shaft portion, the assembling accuracy and workability of the core may be further improved.

By further arranging the cylindrical member which is fitted to the inner portion of the generally annular core, the surface pressure from the cylindrical member may be utilized, and thus the connecting operation of the divided cores may not be manually completed. Further, when the outer diameter of the cylindrical member is larger than the inner diameter of the generally annular core and the cylindrical member is fitted to the inner portion of the annular core by interference fit, the distance between each pole of the rotor may be equalized, and the rotation of the electric motor may be smooth.

By positioning the permanent magnet between the neighboring divided cores so that the magnetizing direction of the magnet is generally perpendicular to the radial direction of the rotor, the magnetic flux may easily pass through the connecting portion between the divided cores.

When the shaft portion and the hole portion of the divided core configured to be fitted to the shaft portion have a polygonal shape, the angular position of the divided core about the shaft portion may be easily determined by using a plane of the polygonal shape.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A rotor of an electric motor, comprising:
a generally annular supporting member;
a plurality of shaft portions positioned on the supporting member in a circumferential direction at regular intervals, the shaft portions extending generally parallel to a rotation axis of the rotor; and
a plurality of divided cores each having a hole portion which is fitted to each of the shaft portions and a connecting portion configured to be connected to a connecting portion of a neighboring divided core,
wherein each of the divided cores is connected to the neighboring divided core by means of the connecting portion while being fitted to the shaft portion so that a generally annular core is formed,
and wherein the connecting portion of the divided core is configured to be connected to the connecting portion of the neighboring divided core by rotating the divided core about the shaft portion.

2. The rotor as set forth in claim 1, further comprising a cylindrical member which is fitted to an inner portion of the generally annular core.

3. The rotor as set forth in claim 2, wherein an outer diameter of the cylindrical member is larger than an inner diameter of the generally annular core, and the cylindrical member is fitted to the inner portion of the generally annular member by interference fit.

4. The rotor as set forth in claim 1, further comprising a permanent magnet disposed between neighboring divided cores so that a magnetizing direction of the permanent magnet is perpendicular to a radial direction of the rotor.

5. The rotor as set forth in claim 1, wherein the hole portion has a polygonal shape, and the shaft portion has a polygonal column shape.

6. The rotor as set forth in claim 1, wherein the hole portion has a circular shape, and the shaft portion has a solid or hollow cylindrical shape.

7. A production method of a rotor of an electric motor, the method comprising the steps of:
positioning a plurality of shaft portions on a generally annular supporting member in a circumferential direction at regular intervals, the shaft portions extending generally parallel to a rotation axis of the rotor;
fitting a plurality of divided cores to respective shaft portions, each divided core having a hole portion which is fitted to each of the shaft portions and a connecting portion configured to be connected to a connecting portion of a neighboring divided core; and
forming a generally annular core by rotating at least one of neighboring divided cores about the shaft portion so that the connecting portions of the neighboring divided cores are connected to each other.

8. The production method as set forth in claim 7, further comprising the step of fitting a cylindrical member to an inner portion of the generally annular core by interference fit, after the step of forming the generally annular core by connecting the divided cores to each other.

* * * * *